July 19, 1927.
A. R. STEVENS ET AL
1,636,082
DRYING MACHINE
Filed March 10, 1926      2 Sheets-Sheet 2
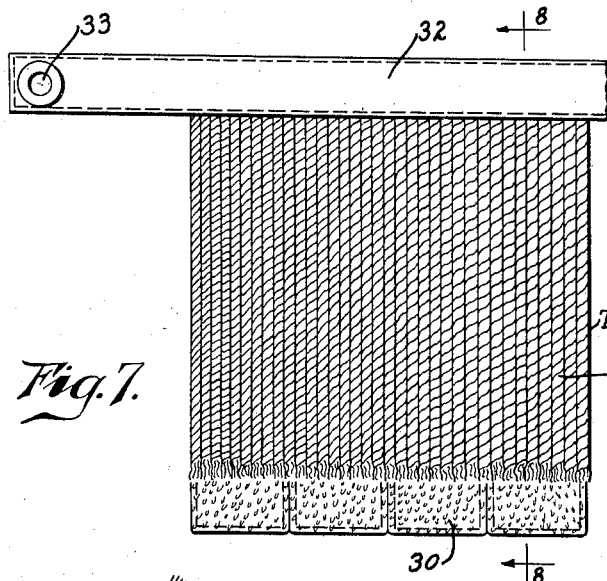
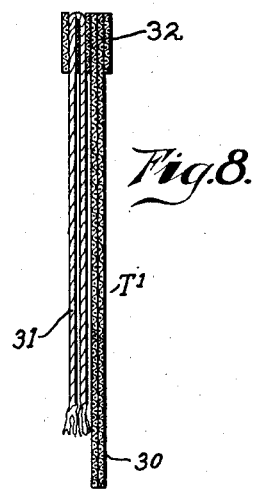
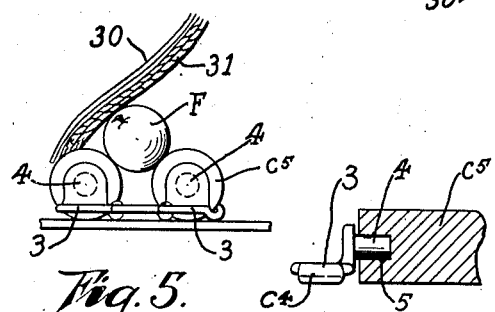
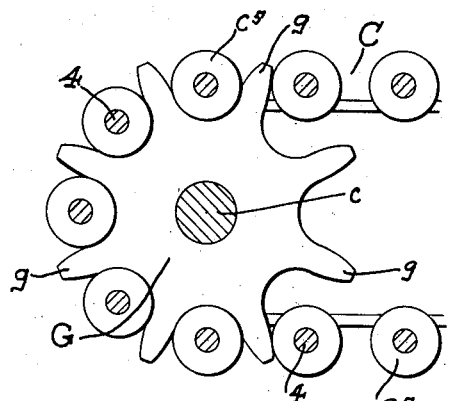
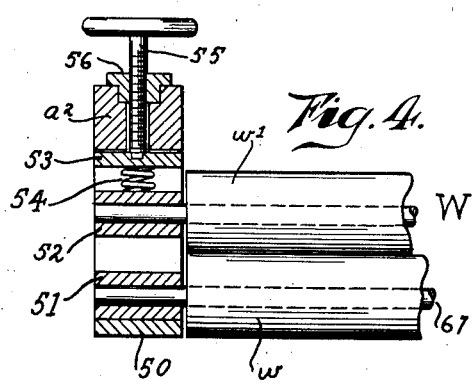
INVENTOR,
Augustus R. Stevens
Francis M. Stevens;
BY
Blakeslee Brown
ATTORNEYS.

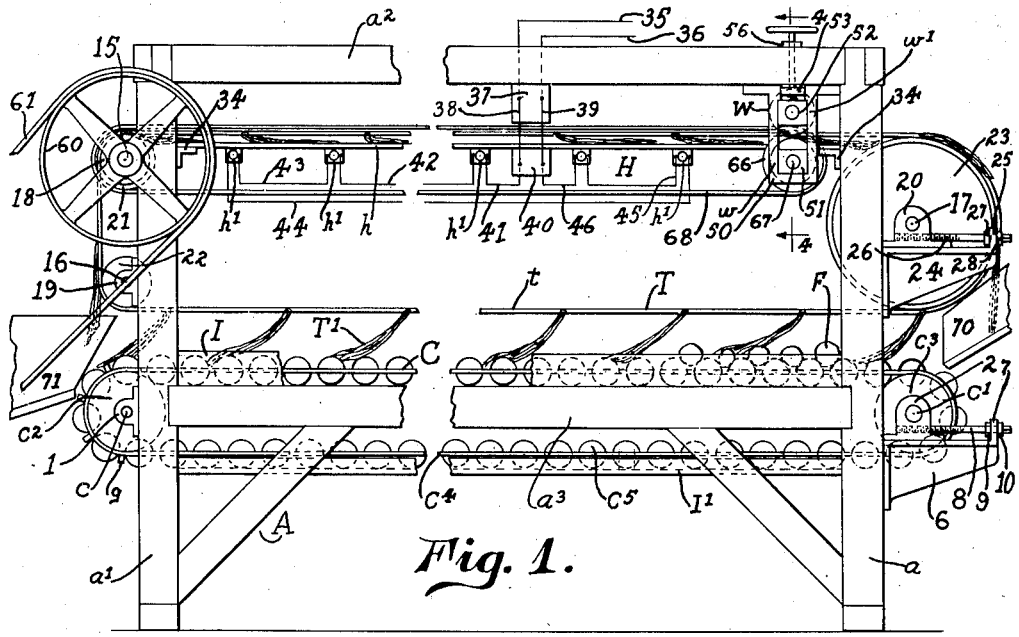

Patented July 19, 1927.

1,636,082

UNITED STATES PATENT OFFICE.

AUGUSTUS R. STEVENS AND FRANCIS M. STEVENS, OF LINDSAY, CALIFORNIA.

DRYING MACHINE.

Application filed March 10, 1926. Serial No. 93,642.

This invention relates to drying machines and more particularly to a machine for drying fruit such as oranges and all other citrus fruits.

The general object of the invention is to provide a fruit drying means which will be rapid and highly efficient in operation.

A more particular object is to provide a fruit drying machine of the character stated which will embody simplicity and convenience of structural arrangement and facility and ease of operation, With the above and other objects in view, the invention consists in the novel and useful provision, formation, combination, association and relative arrangement of parts, members and features, all as hereinafter described, shown in the drawings, and finally pointed out in claims.

In the drawings:

Fig. 1 is a side elevation of the drying machine;

Fig. 2 is a left end elevation of the machine;

Fig. 3 is a vertical sectional view of one end of the fruit conveyor, taken on the line 3—3 of Fig. 2;

Fig. 4 is a fragmentary, transverse vertical sectional view of the towel wringer;

Fig. 5 is an enlarged fragmentary side view of the fruit conveyor and one of the drying towels, showing a fruit in the conveyor in the act of being wiped by the towel;

Fig. 6 is a fragmentary transverse vertical section of the fruit conveyor showing how the conveyor rollers are journaled on the conyevor chain;

Fig. 7 is a fragmentary elevation of one of the drying towels;

Fig. 8 is a vertical section of one of the drying towels taken on line 8—8 of Fig. 7.

Corresponding parts in all the figures are designated by the same reference characters.

Referring with particularity to the drawings, A designates a frame including end members $a$ and $a'$, upper horizontal members $a^2$ connecting the upper part of said end members and lower horizontal members $a^3$ connecting the lower portion of said end members.

An endless fruit conveyor C is mounted in the lower portion of the frame A and extends longitudinally thereof, the conveyor comprising shafts $c$ and $c'$, bearings 1 and 2 in which said shafts are respectively journaled, a pair of sprockets $c^2$ secured on shafts $c$, a pair of sprockets $c^3$ secured on shaft $c'$, a pair of chains $c^4$, each of which extends over a sprocket $c^2$ and a sprocket $c^3$, and a plurality of spaced rollers $c^5$ extending transversely between said chains and journaled at their ends on oppositely disposed links 3 of the chains $c^4$ by means of journales 4 on said links, which journals extend into bearings 5 in the ends of the rollers. The shaft $c$ extends horizontally across the rear end of the frame and is journaled at its ends in the bearings 1 secured on the end frame member $a'$. The shaft $c'$ extends across the front end frame member $a$ and is journaled at its ends in the bearings 2 which are slidably mounted in brackets 6 secured on said front end frame member $a$, each of said brackets 6 being formed with an upturned lip 7 at its outer end through which extends a screw 8 which engages a slide bearing 2, there being collars 9 and 10 on said screw engaging the outer and inner sides of said lip so that when said screw is turned one way or the other its engagement with the bearing will cause the same to slide longitudinally of the frame A in one direction or the other for adjusting the tension of the conveyor chains $c^4$ between the sprockets $c^2$ and $c^3$. Horizontal angle iron tracks I and I' are secured at their ends in the end frame members $a$ and $a'$, on which tracks roll the rollers $c^5$ on the upper and lower reaches respectively of the chain $c^4$, whereby the reaches of the chains are supported in horizontal position. On the shaft $c$ between the sprockets $c^4$ is secured an elongated gear G formed with elongated teeth $g$ which projects between the rollers $c^5$ as they pass over the gear.

An endless towel draper T is mounted above the fruit conveyor C in the upper part of the frame A, and comprises shafts 15, 16 and 17, bearings 18, 19 and 20 in which said shafts are respectively journaled, a pair of sprockets 21 secured on shaft 15, a pair of sprockets 22 secured on shaft 16, a pair of sprockets 23 secured on shaft 17, a pair of chains $t$, each of which extends over a sprocket 21, a sprocket 22 and a sprocket 23, and a plurality of towels T' suspended on said chain $t$ at suitable distances apart. The shafts 15 and 16 extend across the rear end of the machine and their bearings 18 and 19 are secured to the end frame member $a'$. The shaft 17 extends across the front end of the machine and its bearings 20 are slidably mounted on brackets 24 secured to the front end frame member $a$, each of which brackets is formed with upturned lip 25 through which extends a screw 26 in threaded engagement with the bearing 20 on the bracket, there being collars 27 and 28 on the screw engaging opposite sides respectively of said lip 25 so that when the screw is turned one way or the other, the bearing 20 will be moved longitudinally of the frame A in one direction or the other to adjust the tension of the chains $t$ between the sprockets 21 and 22 and the sprocket 23. Each of the towels T' comprises a plurality of laminated towel strips 30 arranged side by side; and a plurality of cords 31 arranged in front of said towel strips, the strips and cords being secured at their upper ends in a strap 32 which extends transversely of the draper T and is buttoned at its ends to the chains $t$ by snap buttons 33.

An electric heater H is provided for heating and drying the towels T', which heater comprises a heating plate $h$ and a plurality of electrical heating elements $h'$ secured to the under side of said plate, which plate is mounted at its ends on angle irons 34 secured to the inside of the end frame members $a$ and $a'$. Electric current is conducted through the heating elements $h'$ through leads 35 and 36 from a source of electrical power, through a thermostatic control 37, leads 38 and 39, junction box 40 and leads 41 to 46 inclusive.

In the upper forward part of the frame A is mounted a wringer W through which the towels T' on the upper reaches of the chains $t$ pass. The wringer W comprises a pair of wringer rollers $w$ and $w'$, a pair of V-shaped frame members 50 secured to the under side of the upper frame members $a^2$, block bearings 51 fitted in the lower part of said frames in which the lower roller $w$ is journaled, block bearings 52 fitted in the upper part of said frames in which the upper roller $w'$ is journaled, presser plates 53 in the upper part of the frames 50 above the upper bearings 52, springs 54 between the bearings 52 and said presser plates, and screws 55 seated in bushings 56 in the upper frame members $a^2$ and engaging the plates 53, whereby the roller $w'$, through the springs 54 and bearings 51 are adjusted to the proper tension against the roller $w$.

On the shaft 15 is secured a driving pulley 60 over which extends a belt 61 driven by power means (not shown) whereby the shaft 15 is rotated. A pulley 62 is also secured on the shaft 15 and a pulley 63 is secured on the fruit conveyer shaft $c$, over which pulleys 62 and 63 extends a belt 64, whereby the conveyor C is driven from the shaft 15. A pulley 65 is also secured on the shaft 15 and a pulley 66 is secured on the shaft 67 of the lower wringer roller $w$, over which pulleys 65 and 66 extends a belt 68 whereby the wringer is driven from the shaft 15.

A hopper 70 is mounted at the forward end of the frame A above the conveyor C and a delivery chute 71 is mounted at the rear end of the frame and conveyor.

The operation of the invention is as follows:

Power being applied through belt 61, the pulley 60 and shaft 15 are rotated. The fruit conveyor C is driven from shaft 15 through pulleys 62 and 63 and belt 64, so that the upper reach of said conveyor travels rearwardly. The towel draper T is driven by the pulley 60 through shaft 15, so that the lower reach of the draper travels forwardly. The wringer W is driven from shaft 15 through pulleys 65 and 66 and belt 68.

The fruit F being first washed is placed in the hopper H which delivers the fruit onto the forward end of the upper reach of the conveyor C. The fruit spreads itself out on the conveyor between and upon the rotating rollers $c^5$ and the fruit is rotated by said rollers, the rollers being rotated by rolling on the tracks I.

The damp towels T' on the upper reach of the draper T are drawn over the hot plate $h$ of the electrical heater H and are heated, but not completely dried, the towels leaving the plate in a warm moist condition. The rolling fruit is carried rearwardly by the conveyor and is wiped by the forwardly moving towels T' on the lower reach of the draper T, the cords 31 engaging the fruit before the strips 30, which towels absorb the moisture from the fruit, whereby the fruit is enabled to dry. The dried fruit is discharged from the rear end of the conveyor through the delivery chute 71. The towels being wet by their contact with the fruit are carried by the draper through the wringer W between the rollers $w$ and $w'$ where they are wrung, and the towels, passing from the wringer in a damp condition are drawn over the hot plate $h$ and the above described operations are repeated. The teeth of the gear G push the fruit out from between the rollers $c^5$ into the delivery chute.

The cords 31 being of such small thickness and of such flexibility, will readily extend between the fruit and over the entire exposed surface thereof above the rollers $c^5$, and said cords will thus wipe the greater portion of the water from the fruit before the strips 30. The strips 30, which carry the heat longer than the cords, follow the cords closely and wipe and absorb the remaining moisture from the fruit, and apply heat to the surface of the fruit which finally dries the same.

The snap buttons 33 permit the towels to be readily detached from the draper to be washed and replaced on the draper.

It is obvious that various changes and modifications may be made in practicing the invention, in departure from the particular showing of the drawing, without departing from the true spirit of the invention.

Having thus disclosed our invention, we claim and desire to secure by Letters Patent:

1. In a drying machine, a conveyor on which the articles to be dried are placed, and towel means for wiping the articles as they are conveyed through the machine; there being means for heating said towel means before wiping the articles.

2. In a drying machine, a conveyor on which the articles to be dried are placed, and towel means for wiping the articles as they are conveyed through the machine; means for wringing said towel means after wiping the articles and before again wiping the same, and means for heating the towels after being wrung and before again wiping the articles.

3. In a drying machine, a conveyor for the articles to be dried, a draper including a plurality of suspended towels for wiping the fruit on the conveyor, and means for driving said conveyor and said draper in opposite directions; a wringer through which the wet towels are wrung after wiping the fruit, and a heater over which the wrung towels pass before wiping the fruit again.

4. In a drying machine, a conveyor on which the articles to be dried are placed, towel means for wiping the articles as they are conveyed through the machine, and electric heating means for heating the towel means before wiping the articles.

5. In a drying machine, a conveyor for the articles to be dried, a draper including a plurality of suspended towels for wiping the fruit on the conveyor, and means for driving said conveyor and said draper in opposite directions; and electrical heater comprising a hot plate and electrical heating elements for heating said plate, the heater being arranged so that the wet towels after wiping the fruit will be drawn over said plate before wiping the fruit again.

6. In a drying machine, a conveyor on which the articles to be dried are placed, towel means for wiping the articles as they are conveyed through the machine, electric heating means for heating the towel means before wiping the articles, and a thermostatic control for preventing the electric heating means from exceeding a pre-determined degree of heat.

7. In a drying machine, a conveyor on which the articles to be dried are placed, and towel means for wiping the articles as they are conveyed through the machine; means for heating the towel means before wiping the fruit, and means for preventing the heating means from exceeding a predetermined degree of heat.

8. In a drying machine, means for carrying the articles to be dried, and towel means for wiping said articles, said towel means comprising a plurality of towel cloth strips and a plurality of cords.

9. In a drying machine, means for carrying the articles to be dried, towel means for wiping said articles, said towel means comprising a plurality of towel cloth strips, and a plurality of cords arranged in front of said towel cloth strips.

In testimony whereof, we have signed our names to this specification.

AUGUSTUS R. STEVENS.
FRANCIS M. STEVENS..